Dec. 16, 1958   R. E. PONDER   2,864,412
MACHINE FOR TRIMMING WOOD HEEL-BLANKS
Filed Nov. 5, 1954   9 Sheets-Sheet 1

INVENTOR.
RAYMOND E. PONDER
BY
John H. Cassidy
ATTORNEY

Dec. 16, 1958   R. E. PONDER   2,864,412
MACHINE FOR TRIMMING WOOD HEEL-BLANKS
Filed Nov. 5, 1954   9 Sheets-Sheet 2

INVENTOR.
RAYMOND E. PONDER
BY
ATTORNEY

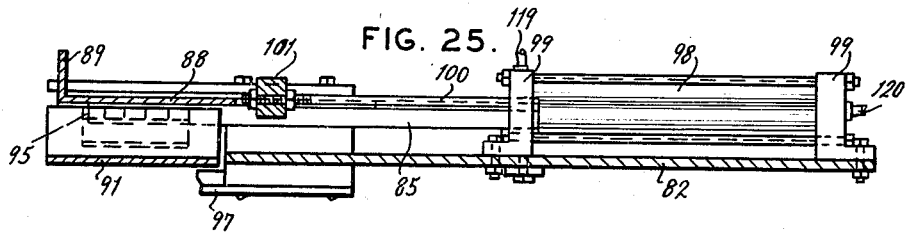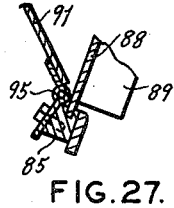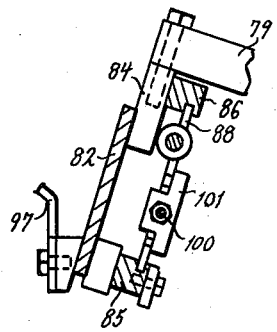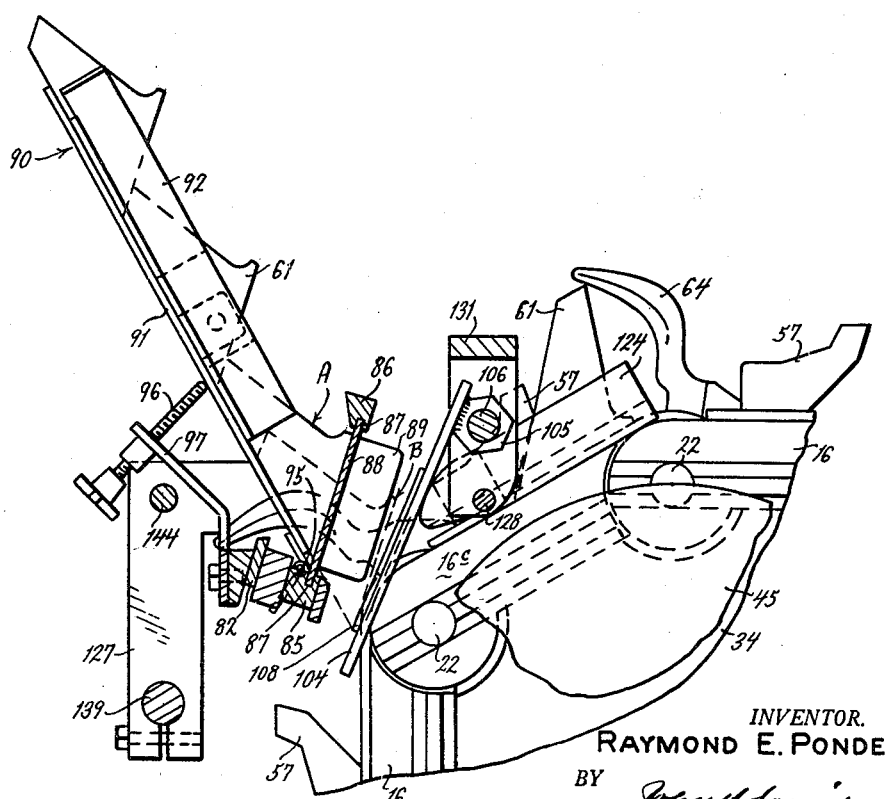

Dec. 16, 1958

R. E. PONDER 2,864,412

MACHINE FOR TRIMMING WOOD HEEL-BLANKS

Filed Nov. 5, 1954

INVENTOR.
RAYMOND E. PONDER
BY John K. Cassidy
ATTORNEY

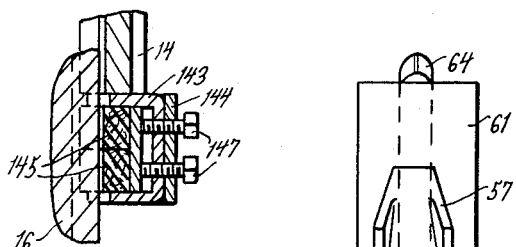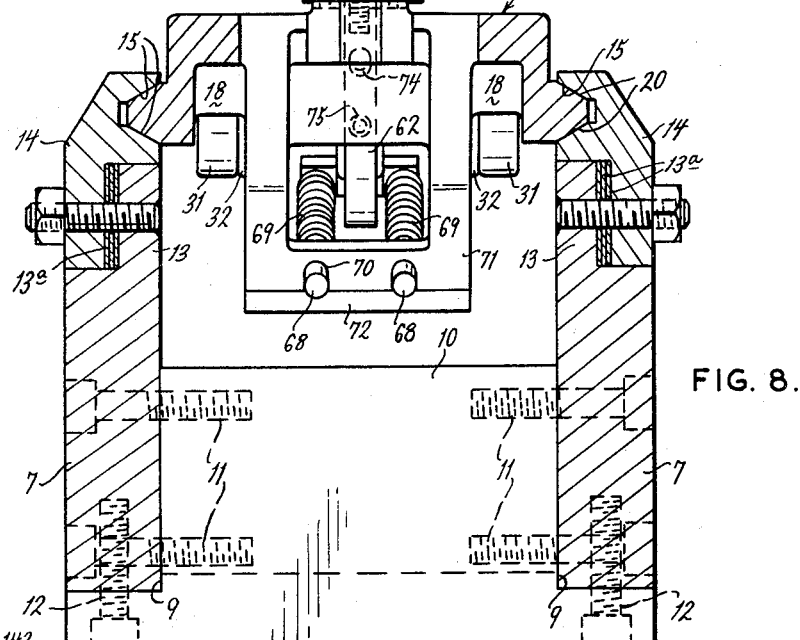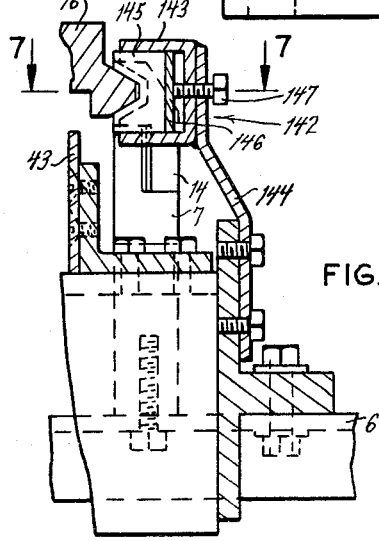

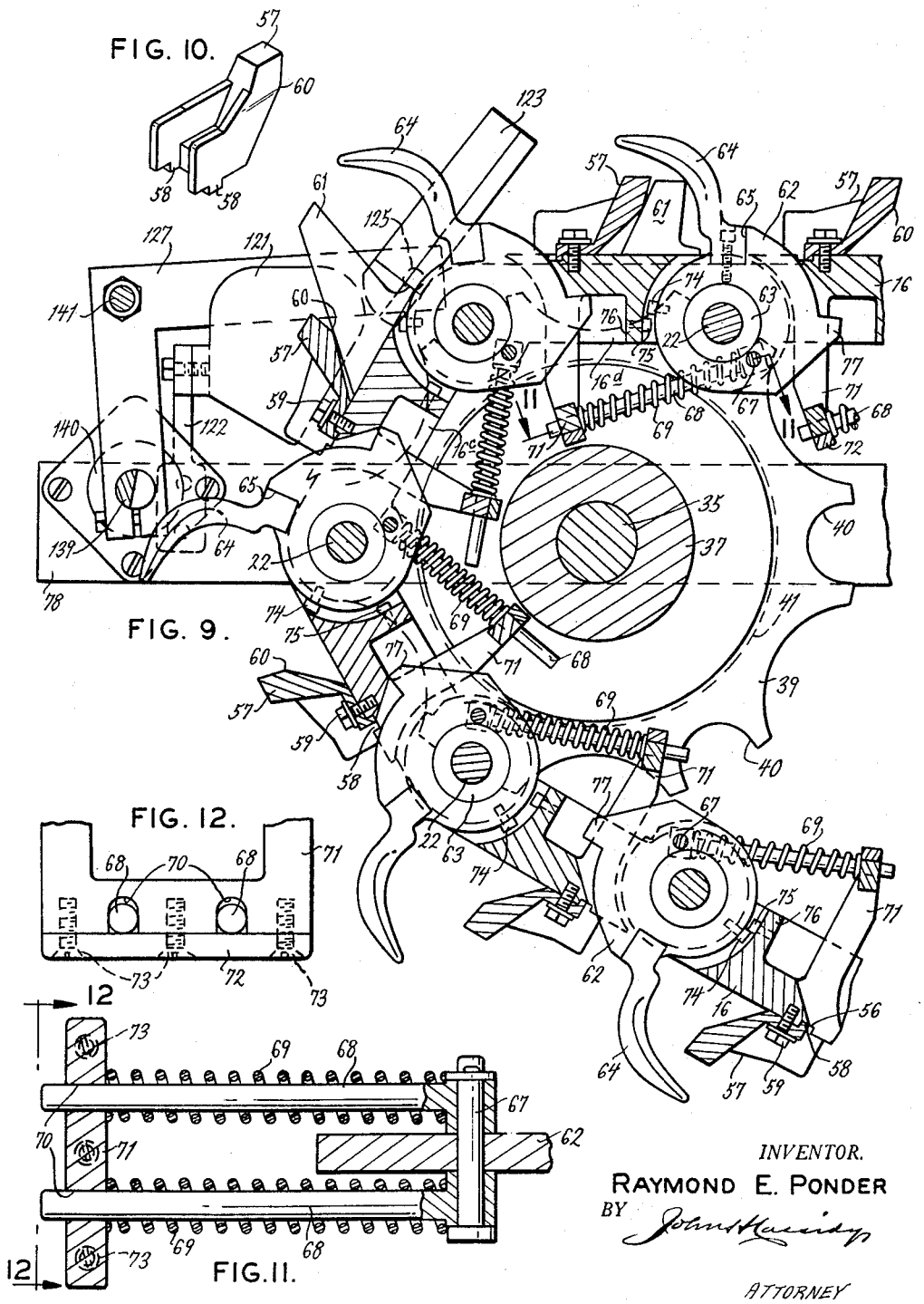

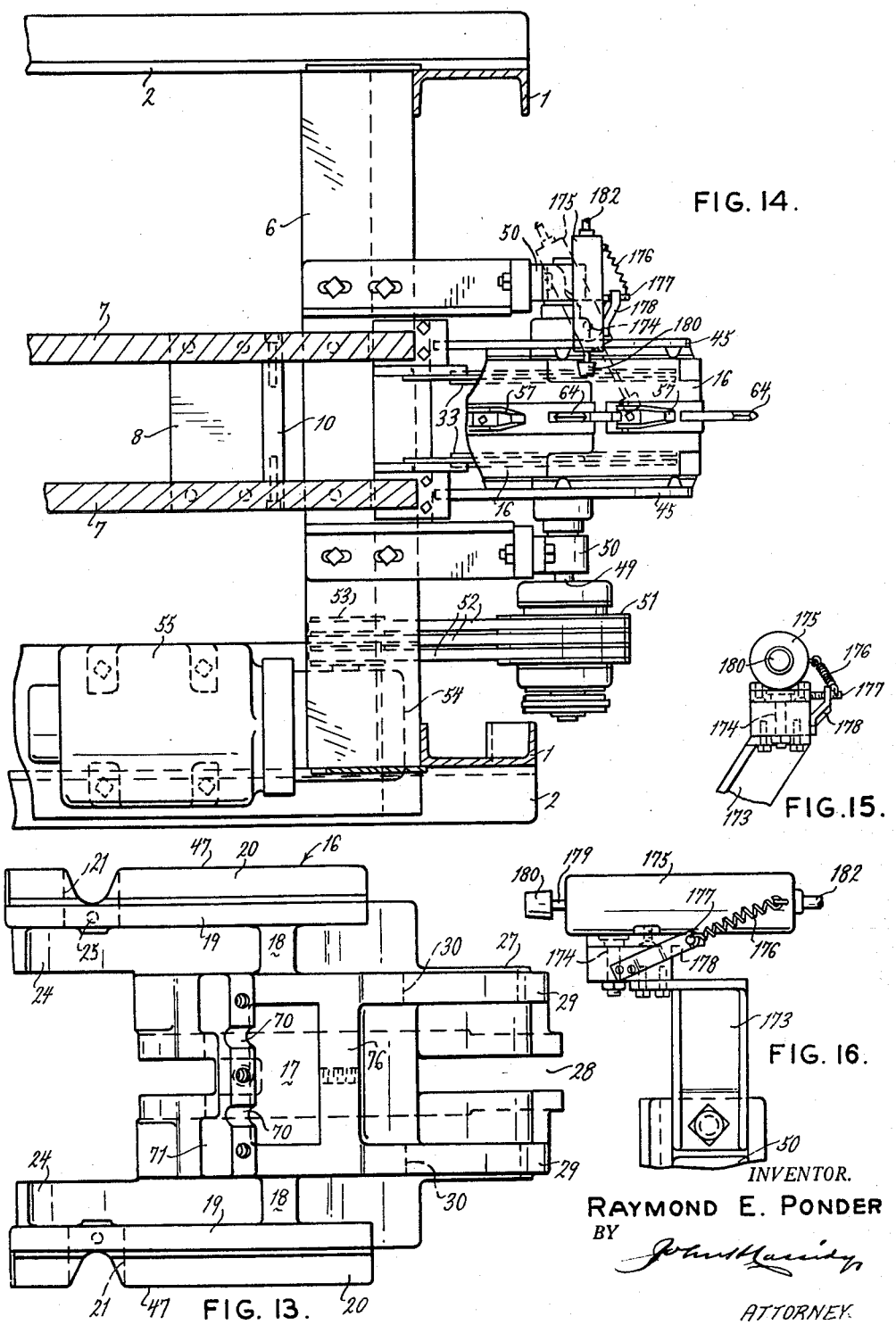

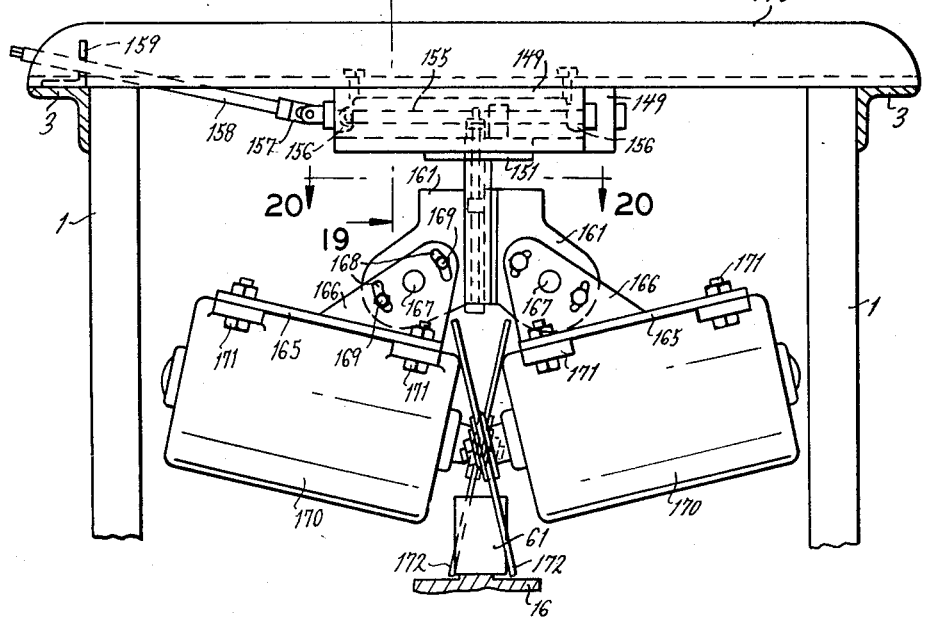

Dec. 16, 1958 R. E. PONDER 2,864,412
MACHINE FOR TRIMMING WOOD HEEL-BLANKS
Filed Nov. 5, 1954 9 Sheets-Sheet 9
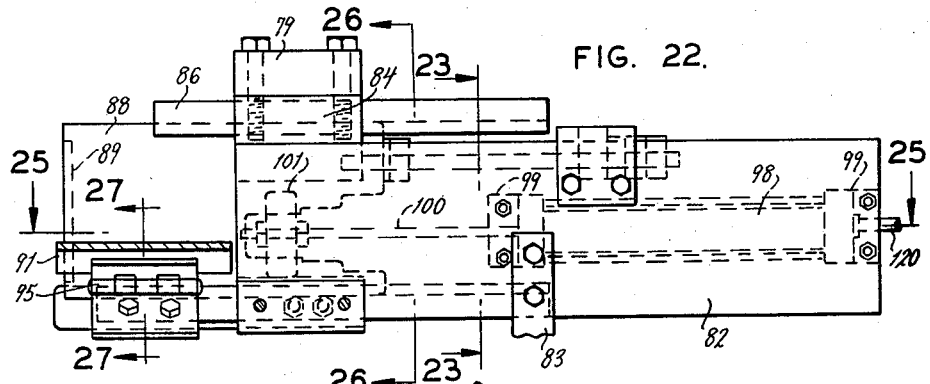
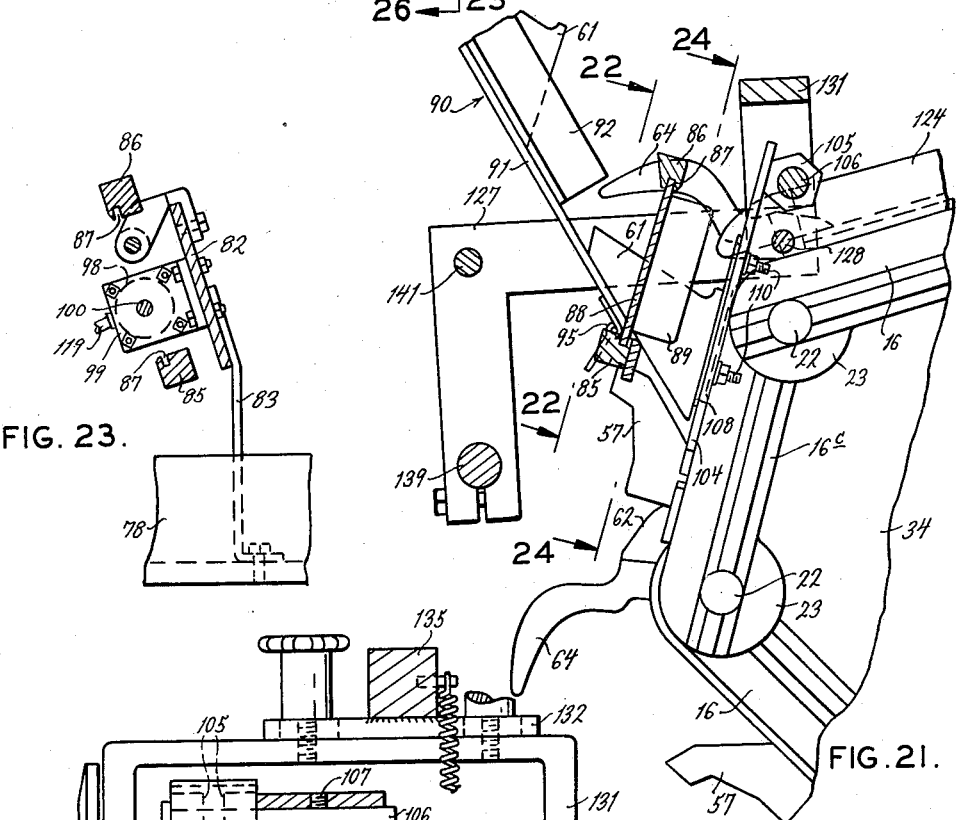
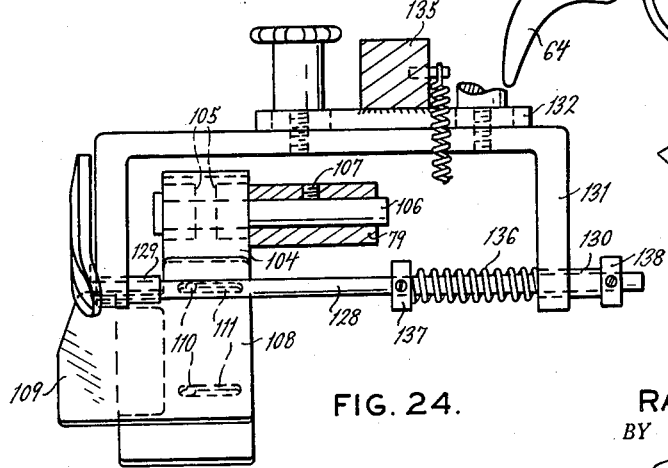
INVENTOR.
RAYMOND E. PONDER
BY John Hannigan
ATTORNEY United States Patent Office 2,864,412
Patented Dec. 16, 1958

2,864,412

MACHINE FOR TRIMMING WOOD HEEL-BLANKS

Raymond E. Ponder, St. Louis, Mo., assignor, by mesne assignments, to Fred W. Mears Heel Company, Inc., Lawrence, Mass., a corporation of Massachusetts Application November 5, 1954, Serial No. 467,141

10 Claims. (Cl. 143—49)

This invention pertains to a machine for trimming wood heel blanks for ladies' shoes. The blanks are usually formed by sawing to a block shape roughly approximating that of the heel preparatory to turning the heel to its final shape. As this block shape leaves a considerable amount of material to be removed by the turning operation, it has been found advantageous to subject the blanks to an additional trimming operation to remove some of this excess material. The machine of this invention has been designed to carry out this additional trimming operation.

An object of this invention, therefore, is to provide a machine which will quickly and cheaply trim the side portions of wood heel blanks to accurately remove a given amount of material.

Another object is to provide improved mechanism whereby the blanks may be securely clamped to a conveyor accurately guided and supported to carry the blanks past cutters to trim the blanks.

Another object is to provide improved feeding mechanism for such a machine.

The machine comprises, generally, an endless conveyor chain of hinged links suitably driven to travel in ways along a fixed bed. The ways firmly support the chain and maintain the links in accurate alignment. Clamps on the links carry the heel blanks. Cutters mounted adjacent their path of travel, trim the blanks as they pass. Improved feeding devices move the blanks into the clamps and accurately center and position them before clamping.

A preferred embodiment of this invention is disclosed in the accompanying drawings, forming part hereof, in which—

Fig. 3 is an enlarged section on line 3—3 of Fig. 2;

Fig. 6 is a section on line 6—6 of Fig. 5;

Fig. 7 is a section on line 7—7 of Fig. 6;

Fig. 8 is an enlarged section on line 8—8 of Fig. 1;

Fig. 9 is a section on line 9—9 of Fig. 2;

Fig. 10 is a perspective detail of the fixed clamp element;

Fig. 11 is a section on line 11—11 of Fig. 9;

Fig. 12 is an end view on line 12—12 of Fig. 11;

Fig. 13 is a bottom view of one of the chain links;

Fig. 14 is a section on line 14—14 of Fig. 1;

Fig. 15 is an enlarged end view of the ejection cylinder as seen from the bottom of Fig. 14;

Fig. 16 is a right-hand side view of Fig. 15;

Fig. 17 is a side view of the link shown in Fig. 13;

Fig. 18 is a section on line 18—18 of Fig. 1;

Fig. 19 is an enlarged section on line 19—19 of Fig. 18;

Fig. 20 is an enlarged section on line 20—20 of Fig. 18;

Fig. 21 is a view similar to Fig. 3 but showing the chain in a different position;

Fig. 22 is a section on line 22—22 of Fig. 21;

Fig. 23 is a section on line 23—23 of Fig. 22;

Fig. 24 is a section on line 24—24 of Fig. 21;

Fig. 25 (Sheet 3) is a section on line 25—25 of Fig. 22;

Fig. 26 is a section on line 26—26 of Fig. 22; and

Fig. 27 is a section on line 27—27 of Fig. 22.

Figure 1:
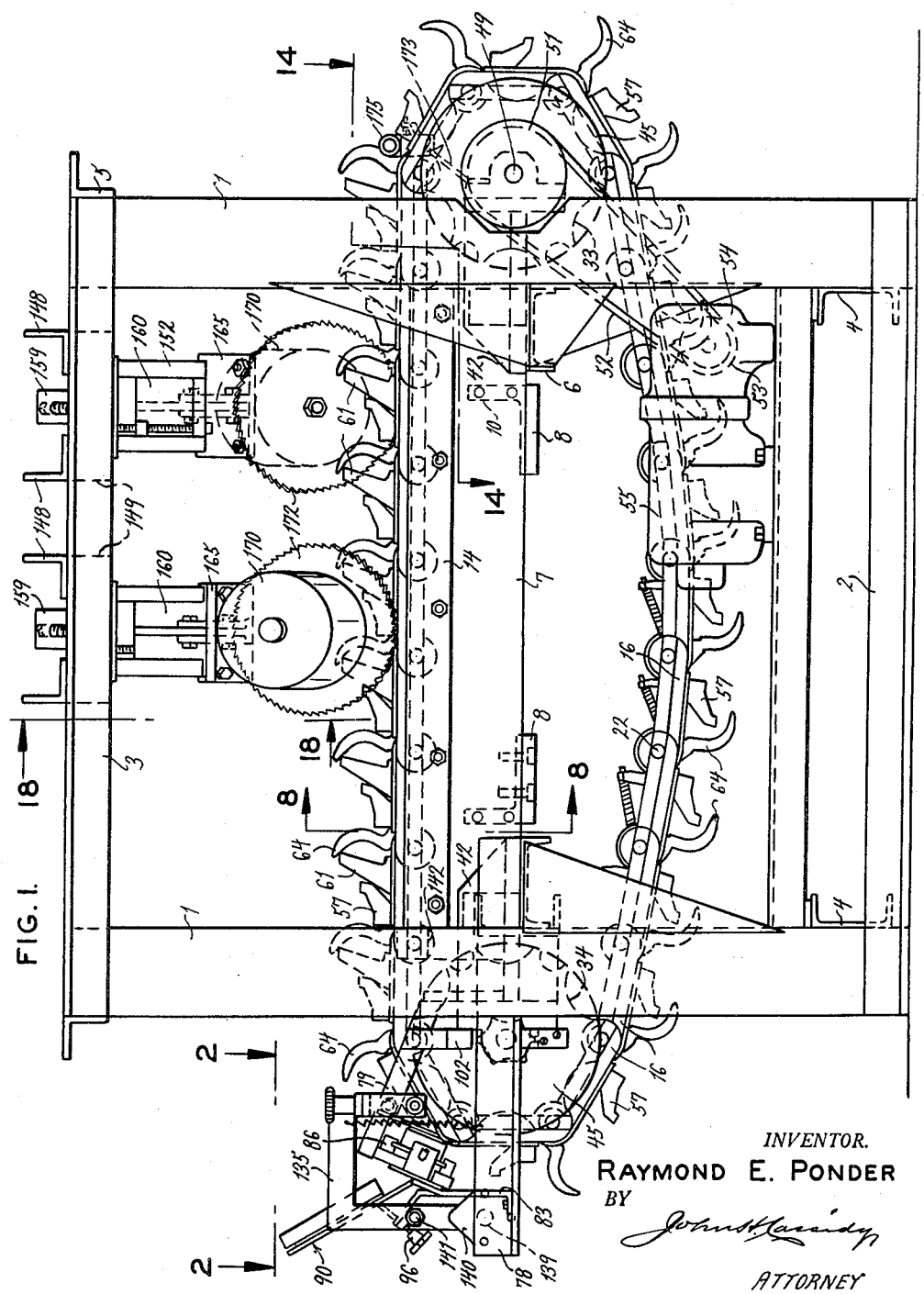
Fig. 1 is a side elevation of a trimming machine embodying this invention.

Referring to the drawings, a supporting frame is provided having uprights 1 (Fig. 1), lower stringers 2, upper stringers 3, lower cross members 4, and upper cross members 5, these parts being welded or otherwise secured together to make a rigid frame. Supported on cross-members 6, secured to the uprights 1 at each end of the frame, is a pair of side bars 7, (Figs. 1 and 8) extending longitudinally of the frame. The bars 7 are secured together in parallel, spaced relation by angle-iron spacers 8 each formed with shoulders at 9 to receive the edges of the bars 7 and having upright web portions 10 positioned between the bars 7, as shown in Fig. 8, and bolted thereto by studs 11. The horizontal part of the spacer is also bolted to the bars by studs 12.

The bars 7 are formed along their upper edges with rabbet grooves forming flange portions 13 along their inside edges. Bolted to the flange 13 of each bar 7 is a bar 14 the upper portion of which extends over the top of the flange 13 and is formed with a groove running along its inner face, said groove having angular side faces 15. The angular grooves 15 in the two bars 14 form ways for guiding a conveyor chain as will now be described. Shims 13a may be inserted for accurate spacing of the bars 14.

The conveyor chain comprises a series of links of special shape hinged to one another by hinge pins. The shape of a link is shown in bottom plan view in Fig. 13 and in side view in Fig. 17. The links are shown in central, vertical, longitudinal section in Fig. 9, and Fig. 8 shows a transverse section in a plane a little to the right of the left-hand hinge pin socket in Figs. 13 and 17. In this specification, the terms "forward" and "rear" will be used with reference to the normal direction of travel of the chain along the ways, such direction being "forward". (To the right, Fig. 1.)

The link, designated generally by the numeral 16, is formed with a central body portion 17 joined by laterally extending bridges 18 with longitudinal side bars 19. The outer portions of the side bars 19 are formed with angular faces 20 fitted to the faces 15 of the ways, (Fig. 8), so that the link will be accurately guided by the ways when moving therealong. These side bars are pierced, near their rear ends, with aligned bores 21 forming hinge pin sockets adapted to receive a hinge pin 22 (Figs. 4 and 9) by which succeeding links are hinged to one another. This part of the side bar has a semi-circular flange 23 extending downward and an arcuate flange 24 extending inward, providing a housing for a ball bearing on the pin 22, as will be described later. A threaded screw hole 25 is formed in the side bar leading to the socket 21 to accommodate a set screw 26 (Fig. 4) whereby the hinge pin 22 may be secured in said socket.

Figure 2:
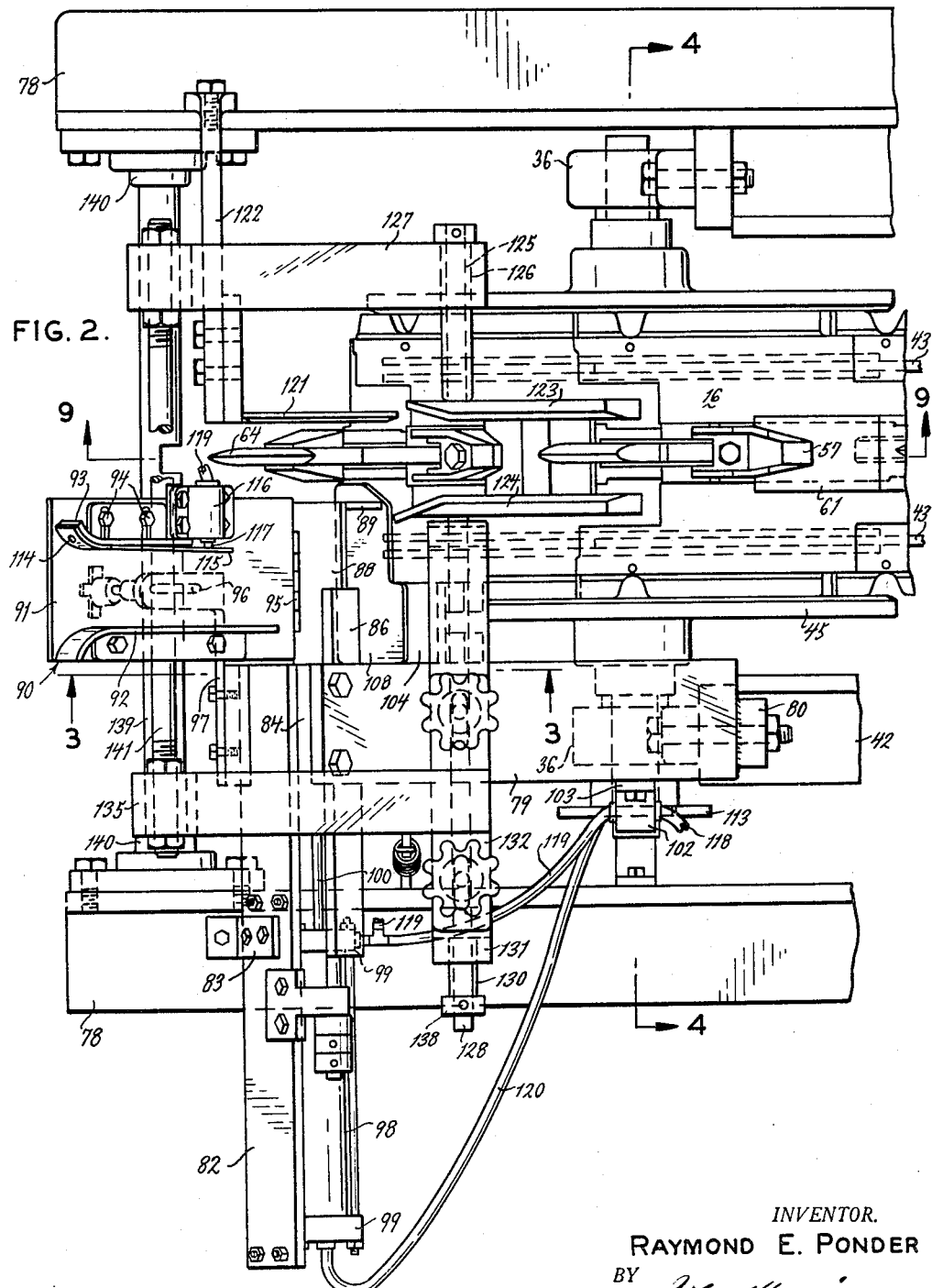
Fig. 2 is an enlarged partial plan view on line 2—2 of Fig. 1.
Figure 4:
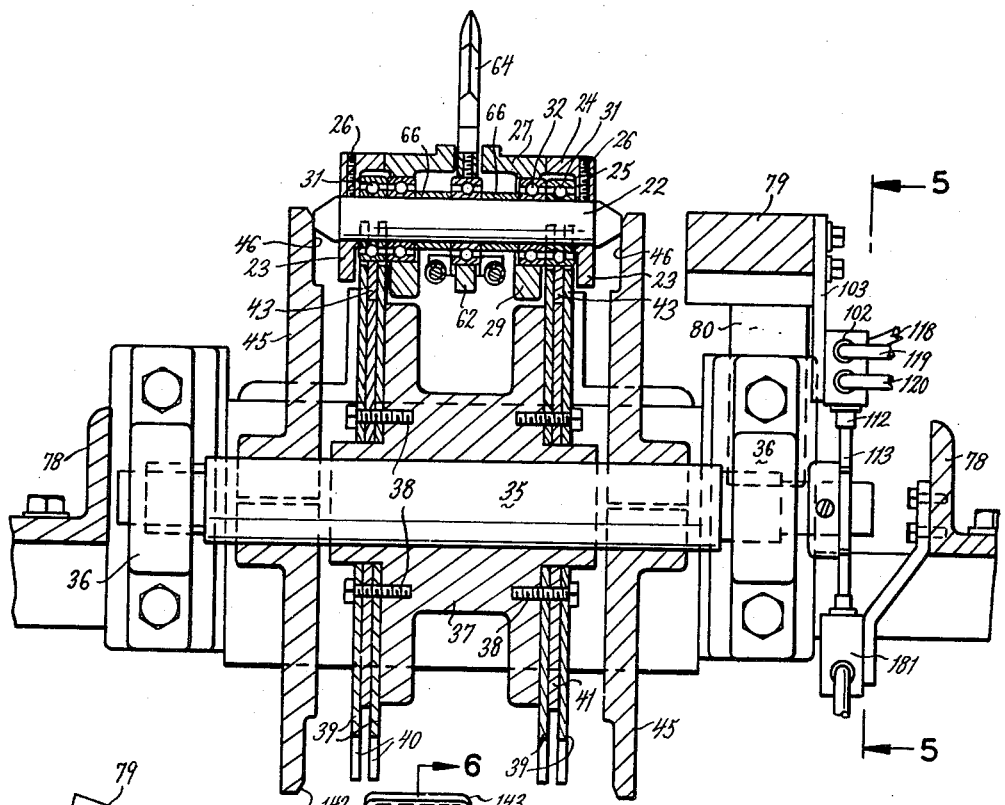
Fig. 4 is a section on line 4—4 of Fig. 2.

The other end of the link has a forward extension 27 (Figs. 13, 17) dimensioned laterally to fit between the flanges 24 of the next preceding link (Figs. 2 and 4). This extension is formed with a longitudinal slot 28 adapted to receive part of a clamp element as will be described later. This extension has a pair of circular vertical flanges 29 each formed with a bore 30 adapted to receive a ball bearing for the hinge pin.

Two successive links of the conveyor chain are hinged to each other as shown in Fig. 4. The hinge pin 22 is supported in the two bores 21 of the forward link and secured by the set screws 26. A ball bearing 31 is mounted on the pin, at each end thereof, just inside the flange 23. Another ball bearing 32 is mounted on the pin just inside each of the bearings 31. The outer races of the bearings 32 are seated in the bores 30 of the rear link. The pin and the bearings 32 provide the hinged connection between the links.

The conveyor chain is supported by the ways 14, 15 (Fig. 8) and by forward and rear sprockets 33 and 34 respectively (Fig. 1). The construction of these two sprockets is the same and is shown in Figs. 4 and 9 for the rear sprocket. The sprocket is supported on a shaft or spindle 35 mounted in suitable bearings 36 on the main frame. A hub 37, mounted on and fixed to the spindle 35, has bolted thereto by studs 38 sprocket members in the form of plates 39. These plates are formed with semi-circular, peripheral sockets 40 centered on the pitch circle of the sprocket and spaced to receive the bearings 31 on the hinge pins of the successive links. In the embodiment shown, two of these plates 39 are mounted on each side of the hub 37 as shown in Fig. 4. Mounted between the plates of each of these pairs is a circular spacer plate 41, to provide a space between the peripheral portions of the sprocket plates 39.

Mounted on a supporting bracket 42 on each of the cross members 6 of the main frame, is a separating arm 43 (Fig. 5) extending between the sprocket plates 39 in the space provided by the spacer plate 41 (Fig. 4). The upper edge of this arm is in line with the bottom of the ball bearing 31 when the latter is at its highest point on the sprocket, and its top is beveled at 44 so that, as the bearing 31 moves with the sprocket beyond said highest point, it will roll onto the arm 43 and thereby be separated positively from the sprocket without any dip in its path of movement. Also mounted on the spindle 35, one on each side of the hub 37, are flanges 45. The peripheral, inside faces of these flanges are accurately machined at 46 (Fig. 4) and spaced apart to receive between them the side faces 47 (Fig. 13) of the links, which are also faced smooth and accurately dimension as to width. The flanges 45 thus serve to accurately center the links as they leave the sprocket and enter the ways 14, 15. The edges of the faces 46 are slightly chamfered at 48 to facilitate the entrance of the links between the flanges as they move onto the sprocket.

The forward sprocket 33 is fixed to a shaft 49 mounted in bearings 50 on the main frame (Figs. 1 and 14). The shaft 49 carries a pulley 51 connected by a multiple V-belt drive 52 to a pulley 53 connected through a gear box to be driven by a motor 55 suitably supported on the main frame. Thus the forward sprocket 33, driven by the motor 55, drives the conveyor chain, pulling it toward the right, Fig. 1, along the ways.

Clamping means are provided for clamping a heel blank on each link 16. The body portion 17 of the link has a flat top surface formed with a transverse groove 56 (Fig. 17). A rear clamp element 57 (Figs. 9 and 10) has a flat bottom adapted to rest on the top surface of the link and lugs 58 extending downward therefrom to engage the groove 56. The element 57 is then bolted to the link by a stud 59. The forward face of the element 57 is formed with two angular surfaces forming a transverse ridge 60 adapted to engage the heel blank 61.

The forward clamp element comprises an annular member 62 mounted on a ball bearing 63 on the middle of the hinge pin 22 and a clamp hook 64 mounted in a socket 65 in said member (Figs. 4 and 9). The bearing 63 is centered on the pin 22 by spacer sleeves 66. A pivot pin 67 passes through the lower portion of the member 62 and has pivotally mounted thereon, on opposite sides of the member 62, spring bars 68 carrying compression springs 69 (Figs. 11 and 12). The other ends of these bars extend through slots 70 in a downward extension 71 on the link 16, and are retained in said slots by a retainer strip 72 secured to the extension 71 by screws 73. The springs 69 serve to tension the member 62 for counter-clockwise rotation on the pin 22. A headed screw or plug 74 (Fig. 9) projecting from the periphery of the member 62 is positioned to engage a similar screw 75 in a transverse web 76 on the bottom of the link 16, to limit this rotation. The member 62 also has a lug 77 projecting forward below the body portion 17 of the preceding link, so as to be engaged by said portion 17 as the preceding link turns about the hinge pin 22 after moving onto the sprocket. This turning movement of the preceding link brings its body portion 17 into engagement with the lug 77 so as to cause the member 62 to turn with the forward link, thereby moving the hook 64 to open the clamp. Thus each clamp is opened as the link preceding it turns with the sprocket. Conversely, as the preceding link moves off the sprocket, these relative movements are reversed and the clamp is closed.

Figure 5:
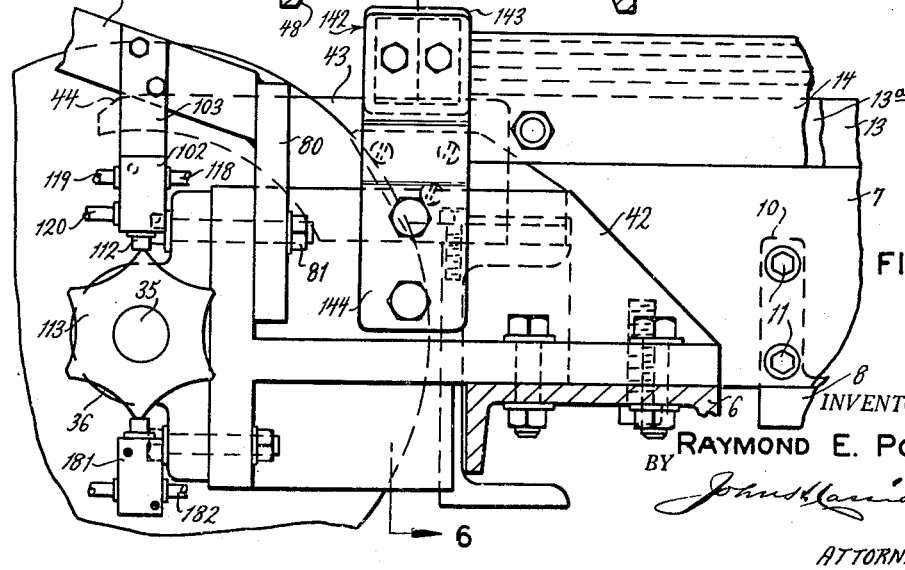
Fig. 5 is a section on line 5—5 of Fig. 4.

Feeding mechanism is provided operating to place a heel blank between the clamp elements while the clamp is open as the link moves about the rear sprocket. This mechanism is shown in Figs. 1, 2, 3, 5, 9, and 21 to 27. In order to support this mechanism, two angles 78 are fixed to the main frame to project rearward therefrom as shown in Figs. 1 and 2. Also, to provide support for certain parts, a bar 79 extends rearward, with an upward slope, between the angles 78 (Figs. 1 and 5). The forward end of this bar is welded to an upright strap 80 bolted to the bracket 42 at 81. A supporting plate 82 is supported by a bracket 83 on the lower angle 78 (Fig. 2) and a strap 84 extending downward from the bar 79. As may be seen from Figs. 1 and 2, the supporting plate 82 is positioned adjacent to and transversely of the path of travel of the conveyor chain and the clamps thereon as the chain passes over the rear idler sprocket 34.

This plate 82 carries a pair of parallel guide bars 85 and 86 (Figs. 3 and 25 to 27) having grooves 87 therealong. Slidably movable in the grooves 87 is a shifter plate 88 having its end bent at right angles thereto to form an abutment 89 for engaging the heel blanks. A blank-feeding chute, indicated generally at 90, comprises a bottom plate 91 and side plates 92 and 93, the latter of which is adjustable by means of bolt-and-slot connections 94 to the plate 91. The bottom plate 91 is hinged at 95 to the bar 85 near the upper end thereof, Fig. 2. The chute is thus mounted for angular adjustment on the hinge 95 by an adjusting screw 96 threaded in a bracket 97 supported on the supporting plate 82 (Fig. 3). The shifter plate 88 normally stands athwart the chute 90 so as to intercept and arrest a heel blank moving down the chute, in the position indicated at A in Fig. 3.

A pneumatic cylinder 98, supported by end brackets 99 on the plate 82, has a piston rod 100 (Figs. 2, 22, 23, 25 and 26) connected by a bracket 101 to the shifterplate 88. The cylinder 98 is actuated by a control valve 102 supported by a bracket 103 vertically adjustable on the bar 79 (Figs. 1, 2, 4, and 5). The actuation of the cylinder 98 is such as to cause it to retract the shifter plate 88 and after a slight pause return the same to its original position athwart the chute 90. When the shifter has been retracted, the heel blank falls from the position A to the position B in Fig. 3, in which it rests upon a locating and orienting plate 104, and upon return movement of the shifter its abutment 89 engages the blank and moves it into an open clamp on the conveyor chain. The locating plate 104 has welded thereto a pair of pivot lugs 105 by which it is pivoted on a pin 106 secured in the bar 79 by a set screw 107 as shown in Figs. 3, 21 and 24. The plate 104 has attached thereto an auxiliary face plate 108 formed with a side-wing portion 109 extending laterally to overlap the conveyor and rest upon the side portions of the links thereof (Figs. 2 and 24). The overhang of the wing portion 109 is adjustable by means of studs 110 on the plate 108 movable in slots 111 in the plate 104. Since the wing 109 always rests on one of the links 16, the blank resting thereon will be positioned thereby to be moved into an open clamp, as shown in Fig. 21. The cylinder 98 is of the double-acting type, with the piston rod 100 normally in its retracted position. It is operated by the four-way valve 102 by admitting a short puff of air behind the piston which forces the piston forward to extend the rod 100 as shown in Fig. 25, the air in front of the piston being released to the atmosphere by valve 102. When the valve 102 returns to its normal position, it passes air to the front of the piston, forcing the piston backward to retract the rod 100 and allows the air in back of the piston to escape to the atmosphere.

The valve 102 has its stem 112 positioned to be engaged by a star-shaped cam-wheel 113 fixed to the spindle 35 of the idler sprocket (Figs. 4 and 5). This cam has the same number of star points as there are sockets 40 on the sprocket, and is positioned on the spindle 35 so that one of these points engages the stem 112 of the valve to open the piston advancing valve momentarily so as to actuate the cylinder 98 at the moment when the idler sprocket is in the position shown in Fig. 21, so that the shifter can move the blank onto an open clamp. In order that the blank may move freely without interference by a succeeding blank coming down the chute 90, means are provided for arresting succeeding blanks until the blank being fed has been moved onto the conveyor. Secured to the side plate 93 of the chute 90, as by a rivet 114, (Fig. 2) is a leaf spring 115. An air cylinder 116, mounted on the side plate 93, normally keeps its stem 117 extended by air pressure to engage the spring 115 and force it away from the side plate 93 so as to narrow the passage between it and the opposite side plate 92 sufficiently to prevent a heel blank from passing therethrough. Blanks inserted into the top of the chute will, therefore, be stopped and held at this constriction of the passage.

The valve 102 controls both the cylinders 98 and 116. It is supplied with air by a hose 118 (Figs. 2, 5) from a suitable source, not shown, and its outlet hoses are 119 and 120, the former going to the front end of cylinder 98 and thence on to the cylinder 116, while 120 goes to rear end of 98 only. On forward stroke of the shifter plate 88 the stem 117 of the cylinder 116 is retracted by an internal spring, thereby permitting the spring 115 to move outward against the side plate 93. This permits the heel blank held by the spring 115 to drop to the shifter plate and on the backward stroke of the shifter plate, the stem 117 returns the spring 115 to its original position to arrest the following heel blank coming down the chute. This spring and the cylinder 110, therefore, provide a sort of escapement mechanism adapted to feed the heel blanks, one at a time, down the chute.

As the shifter 88 moves the heel blank from the locating plate 108 onto the conveyor, the blank is arrested by a stop plate 121 mounted on a bracket 122 supported on the upper angle 78 of Fig. 2. (See also Fig. 9.) This leaves the blank in position on the top surface of a link 16 and in front of the rear clamp element 57 thereof (Fig. 21). As the chain moves forward the blank is picked up by the clamp element 57 and pushed along to enter between two centering fingers 123 and 124 (Figs. 2, 3, 9, 21, and 24). The finger 123 is secured to a pivot pin 125 journaled in a bearing sleeve 126 supported on an angle bracket 127. The finger 124 is secured to a pivot rod 128 journaled in sleeves 129 and 130 in the arms of a C-shaped bracket 131 which is adjustably supported on a bar 132 which is fixed to an angle bracket 135 (Fig. 24) similar to the bracket 127. A spring 136 surrounds the rod 128, bearing at one end on an arm of the bracket 131 and at the other against a collar 137 fixed to the rod 128 but adjustable therealong, as shown in Fig. 24. A stop collar 138, adjustably fixed to the rod 128, bears against the sleeve 130 to locate the centering finger 124. The finger 124 thus applies yielding pressure of the spring 136 to the heel blank to force it against the unyielding finger 123, thereby to center the blank on the link 16 before the clamp closes.

The two angle brackets 127 and 135 are fixed to a pivot rod 139 journaled in bearings 140 on the supporting angles 78 (Fig. 2), and are braced to each other by a cross rod 141 to form a rigid structure which pivots on the rod 139. The forward part of this structure rests on the links of the conveyor chain by contact therewith of the fingers 123 and 124. As the successive links pass over the sprocket 34 these fingers ride up and down, keeping contact with the links, while the brackets 127 and 135 pivot on the rod 139.

As the chain link 16c moves from the position of Fig. 21 through the position of Fig. 9 to that of Fig. 3, the blank is received on top of the link in front of the clamp element 57, it is then centered by the fingers 123 and 124, and finally the front clamp element 64 closes to clamp the blank. The closure takes place as the link moves from the position 16c to the position 16d in Fig. 9 by the gradual disengagement of the under side of the body portion 17 of the preceding link from the lug 77 of the clamp element 64 as the link straightens out at the top of the sprocket to enter the ways. When such disengagement is complete, the clamp element is free to move under the force of the spring 69 to engage and clamp the blank. The clamp element is formed with a relatively sharp edge which, upon engagement, indents the blank to provide a sure grip, secure against slippage.

When each link passes the position 16d in Fig. 9 it is in position to enter the ways. Just before entering the ways, the link passes through a lubricating device indicated generally at 142 (Figs. 1, 5, 6, and 7). This comprises a box 143, supported by means of a bracket 144 on the main frame and containing one or more lubricating pads 145, of felt or the like, fitted to the faces 20 of the links and saturated with a suitable lubricant. A backing plate 146, movable by adjusting screws 147 threaded in the back of the box 143, serves to apply the required pressure to the pads 145.

The links then pass into and along the ways 14, 15 (Fig. 8), carrying the heel blanks firmly clamped in aligned position thereon. Thus held, the blanks are carried past cutters as illustrated in Figs. 1, 18, 19 and 20. While two cutters are shown, only one need be described since they are substantially identical. Mounted on cross members 148 supported on the top stringers 3 of the main frame is a supporting base 149 formed with cross ways 150 extending in a direction transverse to that of the travel of the conveyor chain. Mounted for travel along the ways 150 is a carriage 151 having a vertical bracket 152 extending downward therefrom and formed with vertical ways 153. The carriage 151 has an upstanding lug 154 threaded to receive an adjusting screw 155 journaled in bearings 156 on the base 149 and connected by a universal joint 157 with an operating rod 158 the outer end of which is supported in a bracket 159 on one of the stringers 3. Mounted for movement along the ways 153 of the carriage is a slide 160 having an outstanding vertical web 161. This slide also has a lug 162 threaded to receive an adjusting screw 163 journaled in bearings 164 on the carriage 151. A motor base 165 has a pair of spaced webs 166 receiving between them the web 161 of the slide 160, and pivoted thereto by a pivot pin 167. The web 161 of the slide is provided with arcuate slots 168, concentric with the pin 167, and receiving bolts 169 passing through registering holes in the webs 166, providing clamping bolts for securing the base 165 in adjusted angular position on the slide 160. A motor 170 is mounted on the base 165 by means of bolts 171 and carries on its shaft a cutter, in the form of a saw 172. This structure provides support and adjustment, crosswise, vertically and angularly, to position the cutter 172 for operation on the heel blank as said blank is carried past the cutter by the travel of the link 16. The two cutters are spaced along the ways (Fig. 1) so that they operate successively on each blank, one cutter trimming each side thereof (Fig. 18).

When the blank has been operated upon by the cutters, the link which carries it passes over the sprocket 33 whereby the clamp is opened by operations in reverse to those described for closing the clamp. As the clamp is opened ejector mechanism, shown in Figs. 1, 14, 15 and 16, ejects the blank. Mounted on a bracket 173 on the main frame, by means of a pivot pin 174 is a pneumatic cylinder 175. A spring 176 connected to said cylinder and to a stop screw 177 on a side bracket 178 normally holds the cylinder against said screw to position it for ejecting a blank. The piston rod 179 of this cylinder is equipped with an ejector head 180 at its end. A control valve 181 (Fig. 5) is mounted opposite the valve 102 for engagement by the cam 113 and controls the operation of the cylinder 175 through a connecting air hose 182. This valve operates the cylinder 175, when the clamp is open, to project its piston rod to cause the head 180 to strike the trimmed heel blank and knock it into a suitable receptacle, not shown. The pivotal mounting of the cylinder is to allow for accidental variations in the relative timing of the ejector and the conveyor chain. If the ejector is a little late in acting, the head 180 may be struck by the advancing clamp element 54 before it has time to retract. In such a case, the cylinder 175 will turn on its pivot 174, as indicated in broken lines in Fig. 14, until the head is retracted, whereupon the spring 176 returns the cylinder to its normal position.

*Résumé of operations*

In the normal operation of the machine, an operator feeds heel blanks by hand into the chute 90. As the blanks slide down the chute the lowermost one is stopped by the escapement spring 115 and holds the rest above it. As the conveyor travels and turns the sprocket 34 and the timing cam 113, the control valve 102, operated by said cam, actuates the cylinder 98. This cylinder operates to retract and return the shifter 88. Upon retraction of the shifter, a heel blank resting against it in the position A, Fig. 3, drops to the position B, resting against the auxiliary face 108 of the locating and orienting plate 104. The return movement of the shifter moves this blank onto the conveyor chain just ahead of a rear clamp element 57 (Fig. 21) and against the stop plate 121. The valve 102 also actuates the cylinder 116. This cylinder operates to release the spring 115 momentarily to release one heel blank and arrest the following one, the released blank dropping to the position A to be held there by the shifter until its next operation.

The heel blank which has just been fed to the conveyor is moved forward by the clamp element 57 and enters between the centering fingers 123 and 124 whereby it is centered on the link 16. The preceding link now straightens out at the top of the sprocket thereby closing the forward clamp element 64 down upon the blank to grip it firmly under the pressure of the springs 69. The link carrying this blank now enters the ways 14, 15. Since the faces 20 of the link are accurately fitted to the ways, the link will be rigidly supported during its travel and accurately guided in a straight path. Thus supported and guided, the blank is carried past the two cutters 172 in succession. These cutters trim the top side corners off of the blank as shown in Fig. 18. This removes a considerable quantity of excess material so as to make the subsequent processing of the blank by the turning machine much easier on that machine.

After passing the trimming cutters 172, the link carries the blank on to the forward sprocket 33. As the preceding link tips over the sprocket, its under surface engages the lug 77 to rotate the forward clamp element 64 on its bearing to open the clamp. This releases the blank just as it arrives opposite the ejector cylinder 175 (Fig. 14) and at this moment the cam 113 operates the control valve 181 which in turn actuates the ejector cylinder to eject the blank.

It has been found that this machine will operate efficiently at a speed such as to trim 80 blanks per minute. And such trimming has been found to effect a very substantial saving in the cost of the subsequent turning operation whereby the rear rounded surface of the heel is formed, as the cutters used in that operation have much less material to remove. This effects savings in the power consumed, faster production, increased volume of turning by having less down time due to less cutter sharpening, and longer life of the cutters. The machine of this invention can serve several turning machines.

Various changes may be made in the details of construction, within the scope of the appended claims, without departing from the spirit of this invention. Parts of the invention may be used without the whole and improvements may be added while retaining some or all of the advantages of the invention.

I claim:

1. In a machine for trimming shoe-heel blanks, an endless conveyor chain having links hinged to one another, front and rear clamp elements on said chain formed and positioned to clamp a heel blank therebetween, means for supporting said chain including a sprocket, said links being positioned while on the sprocket for cooperation with said front clamp elements to open the clamp formed by said elements and to close the clamp as the leading link of a pair passes off of the sprocket, a blank-feeding chute, a shifter normally positioned athwart said chute to intercept a heel-blank moving therealong, a locating member for the heel-blank beyond said shifter, means timed by the travel movement of the chain operating to first withdraw said shifter to permit the blank to move against said locating member and immediately thereafter to move said shifter to shift the blank into an open clamp on said chain, an escapement element normally positioned in said chute to stop and retain a succeeding heel-blank moving therealong, and retracting means for said escape element timed to release the retained blank to be intercepted by said shifter when again positioned athwart the chute.

2. In a machine for trimming shoe-heel blanks, an endless conveyor chain having links hinged to one another, front and rear clamp elements on said chain formed and positioned to clamp a heel blank therebetween, means for supporting said chain including a sprocket, said links being positioned while on the sprocket for cooperation with said front clamp elements to open the clamp formed by said elements and to close the clamp as a leading link of a pair passes off of the sprocket, a blank-feeding chute, a shifter normally positioned athwart said chute to intercept a heel-blank moving therealong, a locating member for the heel-blank beyond said shifter, said locating member being mounted so as to rest upon the successive links of the chain as they pass over the sprocket whereby the locating member is positioned to orient the blank for insertion into a clamp, and means timed by the travel movement of the chain operating to first withdraw said shifter to permit the blank to move against said locating member and immediately thereafter to move said shifter to shift the blank into an open clamp on said chain, an escapement element normally positioned in said chute to stop and retain a succeeding heel-blank moving therealong, and retracting means for said escape element timed to release the retained blank to be intercepted by said shifter when again positioned athwart the chute.

3. In a machine for trimming shoe-heel blanks, an endless conveyor chain having links hinged to one another, front and rear clamp elements on said chain formed and positioned to clamp a heel blank therebetween, means for supporting said chain including a sprocket, said links being positioned while on the sprocket for cooperation with said front clamp elements to open the clamp formed by said elements and to close the clamp as the leading link of a pair of passes off of the sprocket, a blank-feeding chute, a shifter normally positioned athwart said chute to intercept a heel-blank moving therealong, a locating member for the heel-blank beyond said shifter, means timed by the travel movement of the chain operating to first withdraw said shifter to permit the blank to move against said locating member and immediately thereafter to move said shifter to shift the blank into an open clamp on said chain, and means for centering the shifted blank on the chain before clamping the same by said clamp elements.

4. In a machine for trimming heel blanks, a bed having ways, an endless conveyor chain having links hinged to one another and having guide members engageable with said ways, whereby said links are guided by said ways to maintain the links in alignment during their travel along said ways, and sprockets supporting said chain, said sprockets having recesses engageable with the hinge portions of said links to support the chain, and a fixed separating arm extending immediately below and in alignment with the bottom of the recesses when the recesses are located in their highest point on said sprocket to engage said hinge portions in said recesses as they leave the sprocket and before entering said ways to positively disengage the same from the sprocket and to preclude any dip in movement.

5. In a machine for trimming heel blanks, a bed having ways, an endless conveyor chain having links hinged to one another and having guide members engageable with said ways to maintain said links in alignment, driving means for moving said chain along said ways, a rear clamp element fixed to one of said links, a front clamp element pivoted on an axis parallel to the axis of the hinge at the forward end of said link, yielding means anchored on said link for tensioning said front element for movement on its pivot toward said rear element to clamp a heel blank therebetween, and means on the preceding link engageable with said front element upon relative movement of the two links on their connecting hinge to move said front element away from said rear element to open the clamp.

6. In a machine for trimming heel blanks having a bed provided with ways and an endless conveyor chain movable along said ways; a link for said chain having a clamp element attached thereto, a second adjacent link, a hinge connection between said links, a second clamp element pivotally mounted with respect to said first link on an axis parallel to the hinge connection, yielding means on said first link engaging said second element with a force tending to move said second element toward said first element to clamp a blank between the two, and the second adjacent link for said chain having means engageable with said second clamp element upon relative flexing movement of said links above the hinge connection to move said second clamp element away from said first clamp element to open the clamp and release the blank.

7. In a machine for trimming heel blanks, a bed having ways, an endless conveyor chain having links hinged to one another and having guide members engageable with said ways sprockets supporting said chain each of said links having a unitary body a fixed clamp member on the upper part of said body a rotary clamp member pivoted on the hinge at the forward end of the link on an axis parallel to the axis of said hinge, spring means on said body tensioning said rotary clamp member for movement rearward toward said fixed clamp member, and a part on said rotary clamp member extending into the path of the preceding link of said chain for engagement by the body thereof upon flexing relative movement of the links about their hinge connection when said links pass onto a sprocket to move said rotary clamp member away from said fixed clamp member.

8. In a machine for trimming heel blanks, a bed having ways, an endless conveyor chain having links hinged to one another and having guide members engageable with said ways, sprockets supporting said chain, one of said links having a unitary body formed with front and rear pivot mountings, pivots in said mountings connecting successive links, one of said sprockets having sockets for receiving said pivots formed in members spaced laterally from each other to leave an annular space therebetween, and a fixed separator arm projecting into said annular space in alignment with the bottom of the sockets when located in their highest point on said sprocket for engagement with said pivots in said sockets to separate said link positively from said sprocket before entering said ways to preclude any dip in movement.

9. In a machine for holding and transporting articles, a bed having ways, a plurality of links providing an endless conveyor chain movable along said ways, hinge connections between said links, and a pair of clamp elements mounted on one of said links, one of said clamp elements being mounted on a pivotal axis parallel with the axis of the hinge connection, a part of said pivotal clamp element extending into the path of the preceding link for engagement by said preceding link upon relative flexing movement of the links about their hinge connection to move said pivotal clamp element away from the other said clamp element, whereby to adapt said clamp elements to receive an article therebetween, and means tending to urge said pivotal clamp element toward the other said clamp element.

10. The combination and arrangement of elements as recited above in claim 9, but further characterized in that the means tending to urge the pivotal clamp element toward the other said clamp element is comprised of a resilient means connected to the pivotal clamp element, and that the said clamp element part is operatively disengageable with the said preceding link when said links are disposed in alignment.

References Cited in the file of this patent

UNITED STATES PATENTS

| | | |
|---|---|---|
| 260,375 | Estabrook | July 4, 1882 |
| 796,095 | Wattie | Aug. 1, 1905 |
| 1,412,910 | Whipple | Apr. 18, 1922 |
| 1,429,309 | Whipple | Sept. 19, 1922 |
| 1,653,932 | Shaw | Dec. 27, 1927 |
| 1,748,368 | Shaw | Feb. 25, 1930 |
| 1,765,987 | Marion | June 24, 1930 |
| 1,803,587 | Bertram | May 5, 1931 |
| 2,026,041 | Howe | Dec. 31, 1935 |
| 2,026,042 | Howe | Dec. 31, 1935 |
| 2,298,955 | Mason et al. | Oct. 13, 1942 |
| 2,345,937 | Joa | Apr. 4, 1944 |
| 2,397,713 | Waller | Apr. 2, 1946 |
| 2,491,950 | Bridge | Dec. 20, 1949 |